(No Model.) 2 Sheets—Sheet 2.
J. A. ANDERSON.
BICYCLE.
No. 604,011. Patented May 17, 1898.
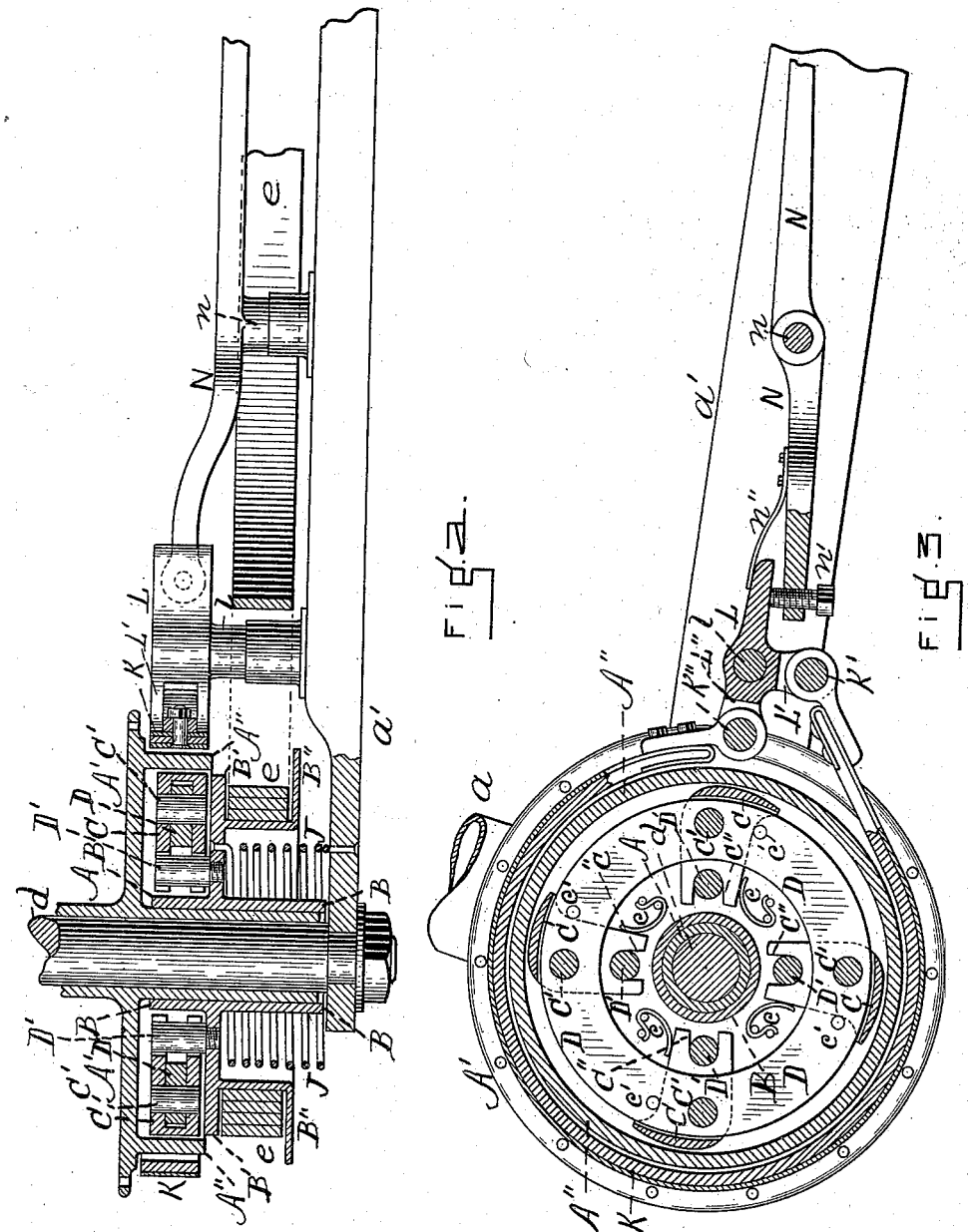
WITNESSES:
INVENTOR:
John A. Anderson,
By his Att'y

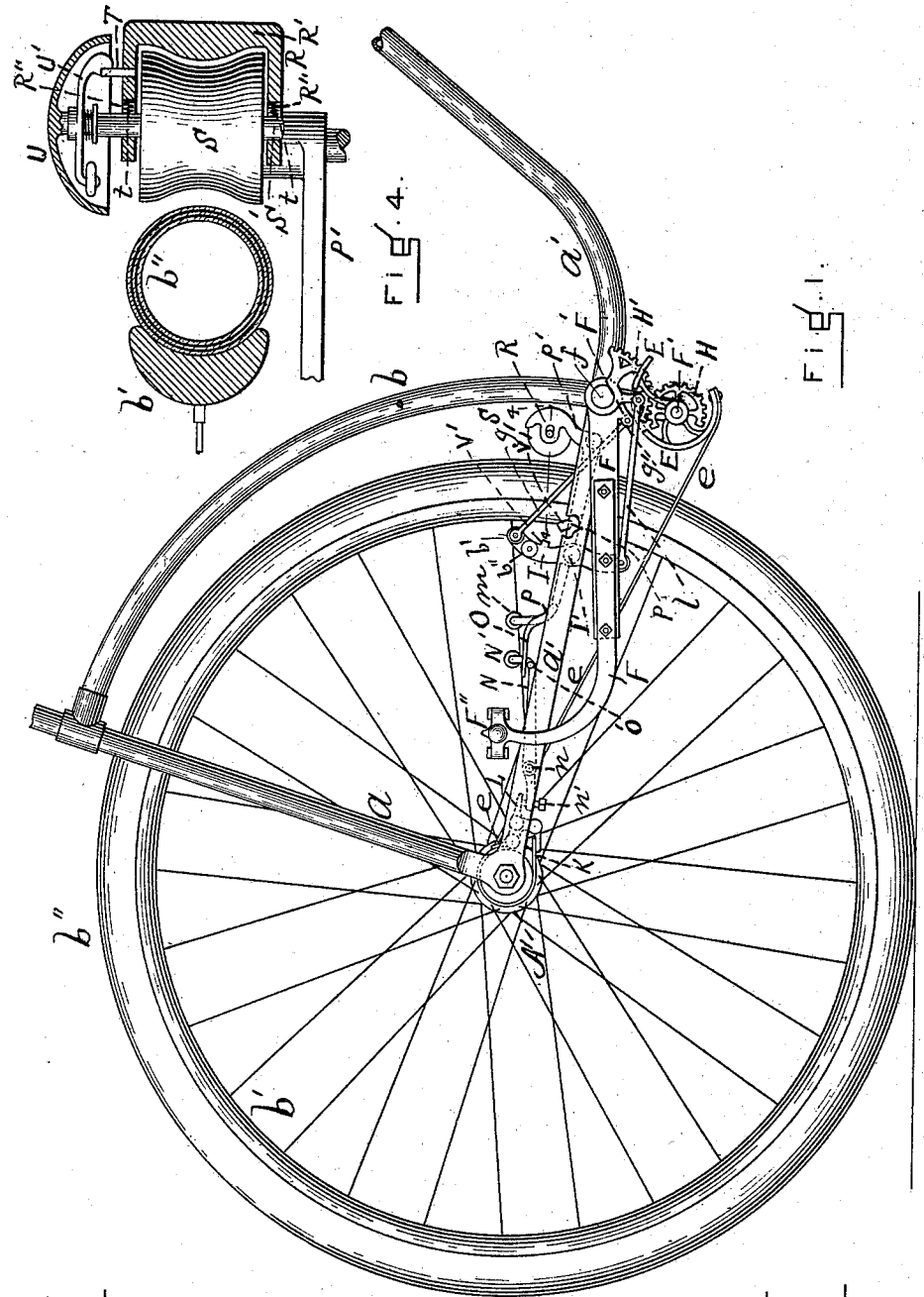

UNITED STATES PATENT OFFICE.

JOHN A. ANDERSON, OF WAKEFIELD, MASSACHUSETTS.

BICYCLE.

SPECIFICATION forming part of Letters Patent No. 604,011, dated May 17, 1898.

Application filed June 17, 1897. Serial No. 641,126. (No model.)

*To all whom it may concern:*

Be it known that I, JOHN A. ANDERSON, a citizen of the United States, residing in Wakefield, in the county of Middlesex and State of Massachusetts, have invented new and useful Improvements in Bicycles, of which the following is a specification.

This invention relates to that class of bicycles in which the pedals are applied to a lever which, by means of mechanism intermediate thereof and the driving-shaft, operates the driving-wheel; and it consists of an improved speed mechanism between the pedals and driving-shaft and of improved mechanism for checking or applying brakes to the machine through the medium of the pedals.

The nature of the invention is fully described in detail below, and illustrated in the accompanying drawings, in which—

Figure 1 is a side elevation of a sufficient portion of a bicycle to illustrate my invention, a small portion of the frame being represented as broken out in order to better illustrate a part of the brake mechanism. Fig. 2 is an enlarged horizontal section taken through the hub of the rear or driving wheel. Fig. 3 is an enlarged vertical section taken through the hub of the rear wheel and driving mechanism thereon. Fig. 4 is an enlarged section in detail, taken on line 4, Fig. 1.

Similar letters of reference indicate corresponding parts.

$a$, $a'$, and $b$ represent portions of the frame, and $b'$ represents the rear or driving wheel, $b''$ being the tire.

$d$ is the driving-shaft, and A is the hub thereon, extending into the flange A' (from which the spokes extend) and formed into the drum A''. A sleeve B is loose on the hub A and is formed with the integral disk or flange B', extending up to the drum A'' and constituting, with said drum and flange A', a case for the dogs C. These dogs are U-shaped and extend around or embrace a ring D, to which they are pivotally secured by the pins C', which extend through said ring and both legs of the dogs. The dogs are bifurcated at C'' at their inner ends to embrace pivots D', and suitable springs $c$ hold them normally from the inner side of the drum A''. $c'$ are ordinary stop-pins. By this construction when power is applied, as below set forth, the dogs act in concert, but do not when released drag on the rim or drum, thus saving friction.

A suitable cord or ribbon $e$ has one end secured to and coiled around the grooved portion of the extension B'', formed on the part B', Fig. 2, while its opposite end is secured to the periphery of a cam-wheel E, pivotally secured to the short arm F' of the pedal-lever F, pivoted at $f$ to the frame and provided with a pedal F''. (A portion of the cam-wheel is represented as broken out.) Rigidly secured to the inner surface of the cam-wheel E is a segment-gear H, which is in engagement with a segment-gear H', loose on the pivot $f$, by means of which the pedal-lever is secured to the frame. A link $g$ has one end secured at $g'$ loosely to the arm F' and its other end at $h'$ or $h''$, as desired, to the bar I, pivoted at I' to the frame $a'$. The other end of this bar is connected by a link $l$ with the segment H. This construction is of course duplicated on the opposite side of the wheel. Pressing down the pedal F'' swings the lever F down and the short arm F' rearward. This moves rearward the segment-gear H, and its engagement with the gear H' causes the former to rotate, and hence imparts rotation to the cam-wheel E, causing the band or ribbon $e$ to mount its higher portion and impart accelerating rotation to the drum A'', (through the medium of the clutching mechanism or dogs above described,) and hence to the hub A, thus speeding up the wheel. When the pedal is released from pressure, the case B' is returned to its original position by the spring J, which connects said case with the frame, as shown in Fig. 2.

K is the brake-band, extending around the drum A'' and having its opposite ends pivotally secured, respectively, at K' and K'' to the downwardly-projecting arm L', and the rearwardly-projecting arm L'' of the lever L pivoted at $l$ to the frame $a'$. A lever N is pivoted at $n$ to the frame, and its rear end underlaps the lever L, being held adjustably in engagement therewith by the screw $n'$ and spring $n''$, Fig. 3, while its front end is formed up into a foot-piece or heel-piece N'. If the foot of the rider is removed from the pedal F'' and the heel placed upon the heel-piece N', pressure thereon will lift the lever L by means of the screw n', with the effect of swinging down the arm L" and swinging forward the arm L', thus tightening the brake-band K upon the drum from both ends and checking the machine.

An elbow-lever, Fig. 1, consisting of the long arm P and short arm P', is pivoted at P" to the frame a'. The long arm P is provided with a vertically-extending toe-piece m and with a rearward extension O, which overlaps a horizontal pin O', extending from the lever N. The short arm P' is provided with a holder, Figs. 1 and 4, consisting of the side pieces R and back piece R', the latter being convex in cross-section in order to correspond with the periphery of the grooved rubber wheel S, which is of shape to fit against the tire b" and is mounted on a spindle S', whose bearings are in the horizontal slots R", formed in the side pieces R. Suitable springs t within the slots R" hold the spindle S' normally rearward or toward the tire. This rubber wheel S constitutes a tire-brake and is operated by the rider pressing his foot upon the toe-piece m. This swings forward the arm P', and hence presses the rubber wheel S against the tire and the portion R' against the periphery of the wheel, thus jamming the wheel S between said portion and the tire and checking the machine. The extension O at the same time presses down the lever N by means of the projecting pin O' and operates the band-brake. A pin T extends from one of the sides R into engagement with the hammer U', connected with the gong U, which is secured to the spindle S', upon which the brake S is rigid. When this brake first touches the tire B", it rotates and imparts rotation through the spindle S' to the gong U, which, as its hammer U' strikes the pin T with every rotation, sounds an alarm. As soon as the pressure upon the foot-piece m is sufficient to cause the portion R' to jam the wheel S between said portion and the tire the rotation of said wheel ceases and the gong stops sounding.

The long arm P of the above-described lever is formed with an upward projection V, and the bar I is formed with a projection V', Fig. 1. If the pedal F" be depressed sufficiently beyond its ordinary throw, this projection V' will strike the projection V and press down the arm P, applying the tire-brake above described. It will be seen, therefore, that the wheel may be checked by pressing the pedal F" down beyond its normal or usual throw, or by pressing down the heel-piece N', or by pressing down the toe-piece m, or by pressing down the two latter simultaneously, the foot resting upon both at the same time.

Having thus fully described my invention, what I claim, and desire to secure by Letters Patent, is—

1. In a bicycle, in combination, the frame; the driving-shaft; the hub A provided with the flange A' and drum A"; the sleeve B provided with the flange B'; the pivot-pins D' extending inward from said flange B'; the U-shaped dogs C bifurcated at their lower ends and embracing said pivots; the ring D extending through and between the legs of said dogs; the pins C' extending through said U-shaped dogs and ring; the pedal-lever pivoted to the frame; a suitable band or cord connected with the sleeve; mechanism intermediate of the pedal-lever and said band or cord for actuating the latter and rotating the sleeve; and a spring for returning said sleeve into its normal position, substantially as described.

2. In a bicycle of the character described, the frame; driving-shaft; hub; and clutching mechanism adapted to engage said hub; the pedal-lever F, F' pivotally secured to the frame; the cam-wheel E supported by the short arm F' of the pedal-lever; a gear-wheel rigid with said cam-wheel; a gear-wheel pivoted to the frame and engaging the gear which is rigid with the cam-wheel; and a band or cord extending from the periphery of the cam-wheel to the clutching mechanism, whereby the speed of the driving-shaft is accelerated, substantially as set forth.

3. In a bicycle of the character described, the frame; driving-shaft; hub provided with the drum A" inclosing a clutching mechanism; the lever L pivoted to the frame and provided with the rearwardly-extending arm L" and downwardly-extending arm L'; the band-brake K extending around the drum and pivotally secured at its opposite ends to said rearwardly-extending and downwardly-extending arms; the lever N pivotally secured to the frame and with its rear end in engagement with said lever L; the elbow-lever P, P' provided with a foot-piece near the rear end of its long arm and with its short arm sustaining the roller or wheel S near the tire; and the rearward extension O from the lever P adapted to engage the forward portion of the lever N, whereby the pressure of the foot upon said foot-piece applies said roller as a brake to the tire and the band-brake to the drum, substantially as set forth.

4. In a bicycle of the character described, the frame; driving-shaft; hub and clutching mechanism adapted to engage said hub; the pedal-lever F F' pivotally secured to the frame; the cam-wheel E supported by the short arm F' of the pedal-lever; a gear-wheel rigid with said cam-wheel; a gear-wheel pivoted to the frame and engaging the gear which is rigid with the cam-wheel; the arm I pivoted to the frame and connected at one end by a link g with the short arm F' and at the other end by a link l with the gear-wheel pivoted to the frame, said arm I being formed with the dog or projection V'; the lever P, P', the long arm thereof being formed with the projection V adapted to be engaged by said dog V'; a band-brake upon the hub; mechanism intermediate of said lever P, P' and band-brake for tightening the latter upon said hub; and a band or cord extending from the periphery of the cam-wheel to the clutch mechanism, substantially as described.

5. In a bicycle, the frame; the driving-wheel; a lever pivotally secured to the frame and with one arm adapted to be pressed by the foot of the rider; a sliding holder supported by the outer arm of the lever in front of the tire of the driving-wheel; an elastic roller sustained by said holder and adapted to be pressed thereby against the tire by the action of said lever; a gong-bell rigid upon the spindle or axle of the roller; and a pin extending from said holder into engagement with the hammer of the gong, substantially as described.

6. In a bicycle, the frame; the driving-wheel; a lever pivotally secured to the frame and with one arm adapted to be pressed by the rider; the holder R R' supported by the outer end of said lever in front of the tire of the driving-wheel, the side portions R of said arm being provided with the slots R''; the spindle S' extending through said slots and held toward the wheel by suitable springs; the roller S fast on said spindle within the holder; a gong-bell rigidly secured to the spindle; and a pin extending from the holder into engagement with the bell, whereby the gong is sounded when the roller is rotated by its first contact with the tire, but silenced when the holder is applied with sufficient pressure against the roller to stop its rotation, substantially as set forth.

JOHN A. ANDERSON.

Witnesses:
HENRY W. WILLIAMS,
A. N. BONNEY.